US011349691B1

(12) United States Patent
Lim et al.

(10) Patent No.: US 11,349,691 B1
(45) Date of Patent: May 31, 2022

(54) APPARATUS AND A METHOD FOR HANDLING NON-CONTINUOUS DATA TRANSFER FOR A DECISION FEEDBACK EQUALIZER IN A MEMORY SUBSYSTEM

(71) Applicant: SKYECHIP SDN BHD, Pulau Pinang (MY)

(72) Inventors: Soon Chieh Lim, Pulau Pinang (MY); Hoong Chin Ng, Pulau Pinang (MY)

(73) Assignee: SKYECHIP SDN BHD, Bayan Lepas (MY)

( * ) Notice: Subject to any disclaimer, the term of this patent is extended or adjusted under 35 U.S.C. 154(b) by 0 days.

(21) Appl. No.: 17/336,067

(22) Filed: Jun. 1, 2021

(30) Foreign Application Priority Data

Mar. 17, 2021 (MY) .............................. PI2021001422

(51) Int. Cl.
*H04L 25/03* (2006.01)
(52) U.S. Cl.
CPC .. *H04L 25/03057* (2013.01); *H04L 25/03267* (2013.01); *H04L 2025/0349* (2013.01)
(58) Field of Classification Search
CPC ......... H04L 25/03006; H04L 25/03019; H04L 25/03057; H04L 25/03949; H04L 2025/03484; H04L 2025/0349
USPC ......... 375/232, 233, 346, 348; 708/322, 323
See application file for complete search history.

(56) References Cited

U.S. PATENT DOCUMENTS

| 7,542,508 | B2* | 6/2009 | Marlett | H04L 25/03057 375/233 |
| 7,983,333 | B2* | 7/2011 | Momtaz | H04L 25/03057 375/233 |
| 8,401,063 | B2* | 3/2013 | Erba | H04L 25/0307 375/233 |
| 8,509,299 | B2* | 8/2013 | Finn | H04L 25/03885 375/233 |
| 8,711,922 | B2* | 4/2014 | Shen | H04L 25/03057 375/233 |
| 2005/0254569 | A1* | 11/2005 | Momtaz | H04L 25/03057 375/233 |
| 2015/0010047 | A1 | 1/2015 | Zhong et al. | |
| 2018/0114564 | A1 | 4/2018 | DeSimone et al. | |

* cited by examiner

*Primary Examiner* — Young T. Tse
(74) *Attorney, Agent, or Firm* — Aslan Law, P.C.

(57) ABSTRACT

An apparatus and a method for handling non-continuous data transfer for a decision feedback equalizer in a memory subsystem. The apparatus includes a plurality of end-of-transfer detection flip-flops configured to sample a read data enable signal; a flag flip-flop; a first logic circuit configured to generate a load enable signal in response to the end-of-transfer detection flip-flops and the flag flip-flop; a second logic circuit configured to generate a load data in response to the end-of-transfer detection flip-flops, the flag flip-flop and the read data enable signal; a plurality of first-in-first-out buffers configured to receive the load enable signal and the load data, and unload the load data as an end-of-transfer indicator in line with data strobe; and a plurality of bypass flip-flops configured to generate a bypass signal in response to the end-of-transfer indicator.

6 Claims, 13 Drawing Sheets

APPARATUS AND A METHOD FOR HANDLING NON-CONTINUOUS DATA TRANSFER FOR A DECISION FEEDBACK EQUALIZER IN A MEMORY SUBSYSTEM

CROSS-REFERENCE TO RELATED APPLICATIONS

This application claims priority to MY Patent Application No. PI2021001422 filed on Mar. 17, 2021, the entire contents of which are hereby incorporated by reference.

TECHNICAL FIELD

The present invention relates generally to a memory subsystem that utilizes decision feedback equalization. More particularly, the present invention relates to an apparatus and a method for handling non-continuous data transfer for a decision feedback equalizer in a memory subsystem.

BACKGROUND ART

In high speed physical interfaces, a decision feedback equalizer is normally added to a receiver to eliminate effect of inter-symbol-interference (ISI) so as to improve signal integrity of incoming data.

Numerous efforts have been made to provide improved decision feedback equalizers for reliable data transfer. Some of the efforts are discussed in the following references.

US2018114564A1 discloses an apparatus including a receiver circuit and a data buffer. The receiver circuit may comprise a decision feedback equalizer (DFE). The data buffer circuit may be configured to initialize a condition of the receiver circuit in response to a control signal prior to reception of a command sequence associated with a directed access to a memory system. The control signal generally indicates detection of a non-consecutive clock associated with a start of the command sequence. The data buffer circuit may generate one or more tap enable signals configured to determine a number of clock cycles during which a contribution of one or more taps of the decision feedback equalizer (DFE) are delayed.

US2015010047A1 teaches a method comprising receiving an input signal at an input of a receiver and retrieving a data sample signal and an error sample signal from the input signal. The method also comprises applying an adaptive procedure to generate a feedback code using the data sample signal and the error sample signal for feeding back into a decision feedback equalization (DFE) module. Further, it comprises converting the feedback code into a corresponding voltage value and assigning the corresponding voltage value as a tap weight for the DFE module. Finally, it comprises generating an edge sample signal by applying DFE to the input signal using the DFE module, wherein the DFE is based on the tap weight.

The aforementioned references and other relevant solutions may strive to provide improved decision feedback equalizers. Nevertheless, they still have a number of limitations and shortcomings. For example, they do not provide a solution to tackle misalignment issues arising from non-continuous data transfer for a decision feedback equalizer.

FIG. 1 illustrates an existing four-tap decision feedback equalizer. The decision feedback equalizer can decide the value of current sample by summing current input value with weighted values of previous four unit intervals (UIs) of data. For example, the current flip-flop D0 value is equal to the sum of previous flip-flop D3 value weighted with W0, previous flip-flop D2 value weighted with W1, previous flip-flop D1 value weighted with W2, previous flip-flop D0 value weighted with W3 and current input value. The decision feedback equalizer works well for continuous data transfer. However, misalignment issues may arise when there is non-continuous data transfer.

FIG. 2 is a waveform illustrating a case of non-continuous data transfer where two sets of data transfer are separated by two UIs of idle data. The actual captured value derived from a decision feedback equalizer for UI of "J" should be from the weighted sum of two UIs of idle data and the UIs of "G" and "H". However, during the idle time, the data strobe is not toggling and thus the idle data is not sampled, hence the existing decision feedback equalizer will inappropriately take the values of the previous four UIs of data which are "H", "G", "F" and "E" into consideration. As a result, there is misalignment between the flip-flops D0-D3 and the actual state at I/O pad.

Accordingly, there remains a need to have an apparatus and a method for handling non-continuous data transfer for a decision feedback equalizer in a memory subsystem.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide an apparatus which can handle non-continuous data transfer for a decision feedback equalizer in a memory subsystem.

It is also an objective of the present invention to provide an apparatus which is capable of detecting the end of a set of data transfer.

It is yet another objective of the present invention to provide an apparatus which can determine how many unit intervals of idle data are present between a set of data transfer and a subsequent set of data transfer.

It is also an objective of the present invention to provide an apparatus which is capable of staggering bypass of internal flip-flops of a decision feedback equalizer during idle time.

It is also an objective of the present invention to provide a method for handling non-continuous data transfer for a decision feedback equalizer in a memory subsystem.

Accordingly, these objectives may be achieved by following the teachings of the present invention. The present invention relates to an apparatus for handling non-continuous data transfer for a decision feedback equalizer in a memory subsystem. The apparatus is characterized by a plurality of end-of-transfer detection flip-flops configured to sample a read data enable signal; a flag flip-flop; a first logic circuit configured to generate a load enable signal in response to the end-of-transfer detection flip-flops and the flag flip-flop; a second logic circuit configured to generate a load data in response to the end-of-transfer detection flip-flops, the flag flip-flop and the read data enable signal; a plurality of first-in-first-out buffers configured to receive the load enable signal and the load data, and unload the load data as an end-of-transfer indicator in line with data strobe; and a plurality of bypass flip-flops configured to generate a bypass signal in response to the end-of-transfer indicator. Further, the bypass signal and the end-of-transfer indicator determine an idle data or a flip-flop data as an output data. Further, the output data is multiplied with a coefficient in the decision feedback equalizer.

The present invention also relates to a method for handling non-continuous data transfer for a decision feedback equalizer in a memory subsystem. The method is characterized by the steps of sampling a read data enable signal by a plurality of end-of-transfer detection flip-flops; generating a load enable signal in response to the end-of-transfer detection flip-flops and a flag flip-flop by a first logic circuit; generating a load data in response to the end-of-transfer detection flip-flops, the flag flip-flop and the read data enable signal by a second logic circuit; receiving the load enable signal and the load data, and unloading the load data as an end-of-transfer indicator in line with data strobe by a plurality of first-in-first-out buffers; and generating a bypass signal in response to the end-of-transfer indicator by a plurality of bypass flip-flops. Further, the bypass signal and the end-of-transfer indicator determine an idle data or a flip-flop data as an output data. Further, the output data is multiplied with a coefficient in the decision feedback equalizer.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figures, with like reference numbers referring to like structures across the views, wherein.

DETAILED DESCRIPTION OF THE INVENTION

Figure 1:
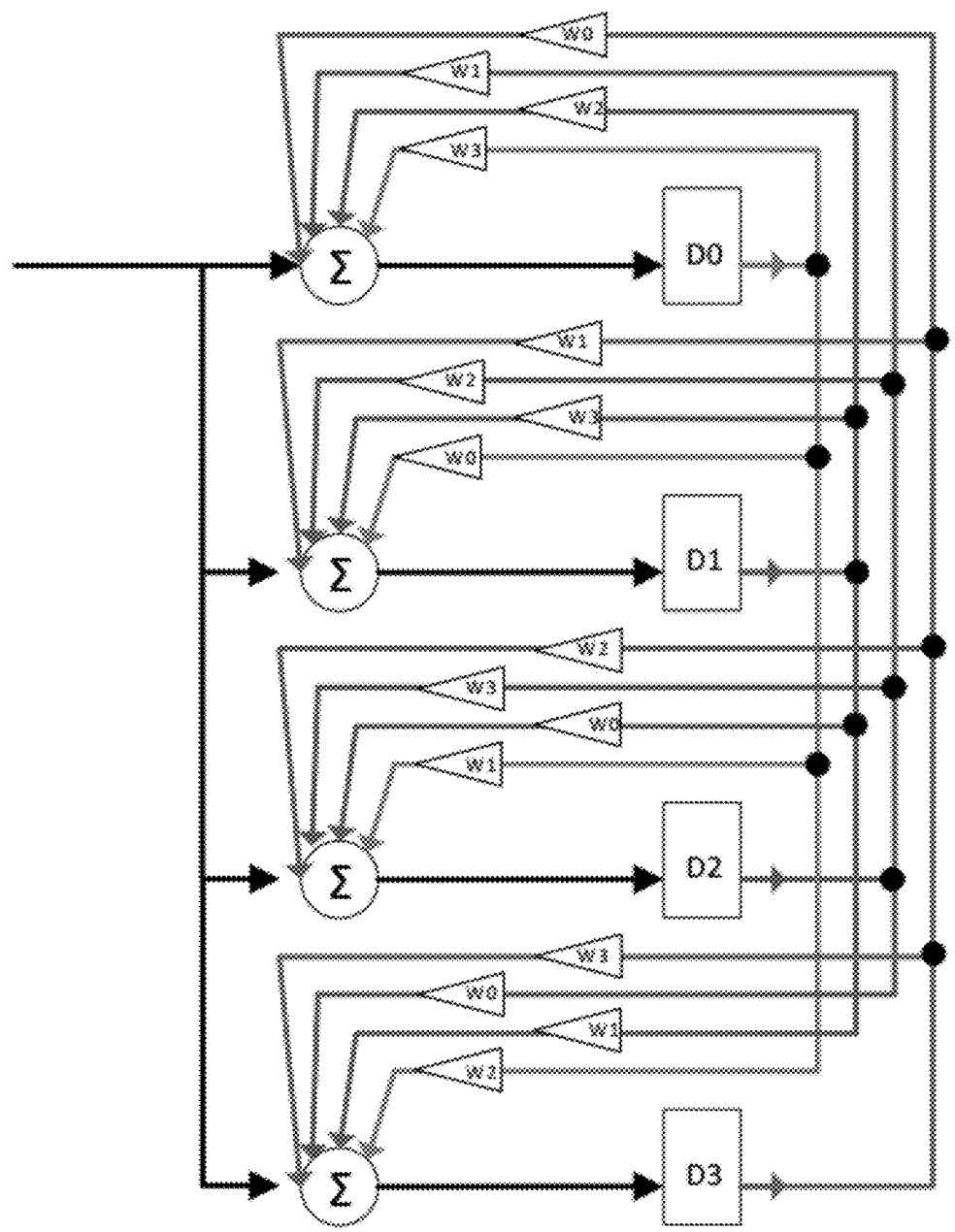
FIG. 1 illustrates an existing four-tap decision feedback equalizer.
Figure 2:
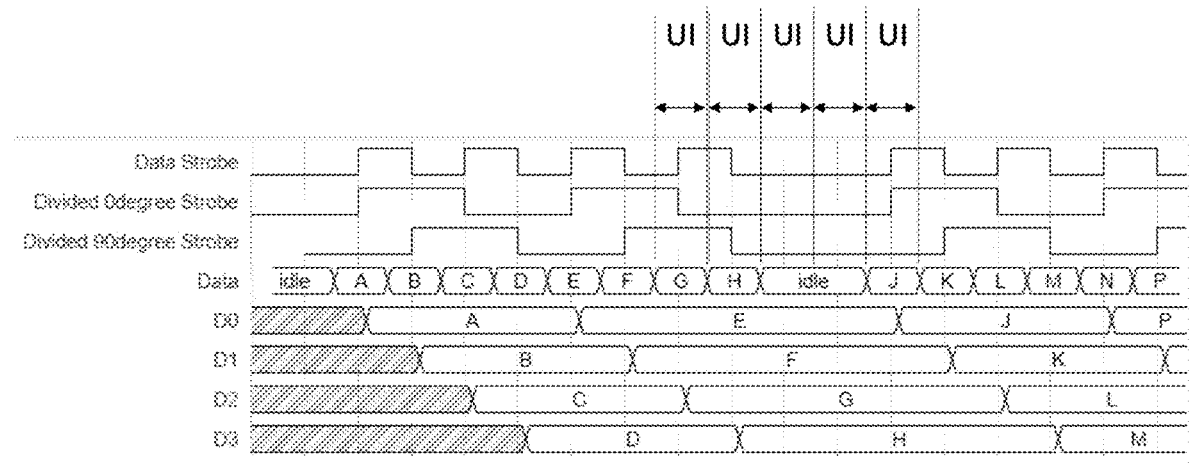
FIG. 2 is a waveform illustrating a case of non-continuous data transfer where two sets of data transfer are separated by two UIs of idle data.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

The present invention relates to an apparatus for handling non-continuous data transfer for a decision feedback equalizer in a memory subsystem. The apparatus comprises a plurality of end-of-transfer detection flip-flops (2) configured to sample a read data enable signal; a flag flip-flop (4); a first logic circuit (6) configured to generate a load enable signal in response to the end-of-transfer detection flip-flops (2) and the flag flip-flop (4); a second logic circuit (8) configured to generate a load data in response to the end-of-transfer detection flip-flops (2), the flag flip-flop (4) and the read data enable signal; a plurality of first-in-first-out buffers (10A and 10B) configured to receive the load enable signal and the load data, and unload the load data as an end-of-transfer indicator in line with data strobe; and a plurality of bypass flip-flops configured to generate a bypass signal in response to the end-of-transfer indicator. Further, the bypass signal and the end-of-transfer indicator determine an idle data or a flip-flop data as an output data. Further, the output data is multiplied with a coefficient in the decision feedback equalizer.

In accordance with an embodiment of the present invention, the apparatus can be applied in LPDDR4/5 and DDR4/5 memory subsystems.

Referring to the drawings, the invention will now be described in more details.

Figure 3:
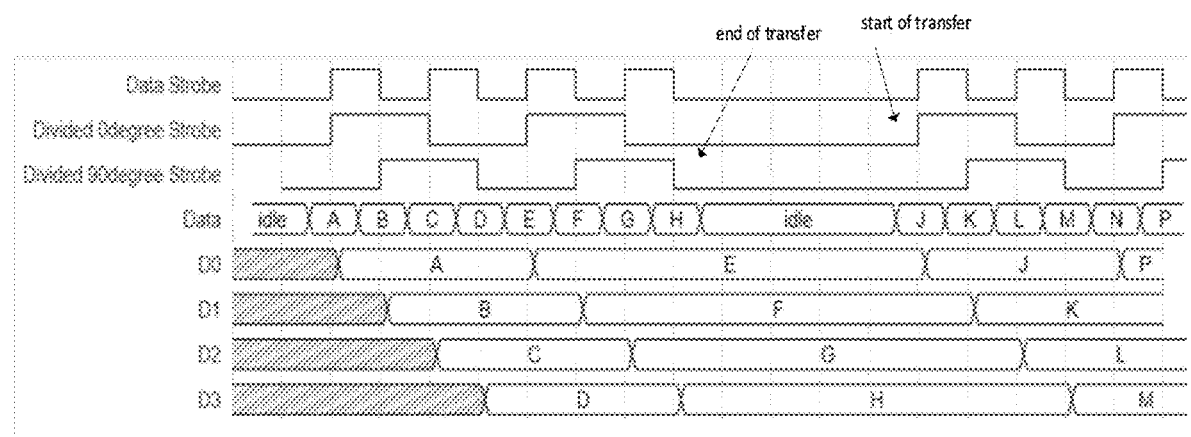
FIG. 3 is a waveform illustrating the end of a set of data transfer happens on flip-flop D3 in accordance with an embodiment of the present invention.
Figure 4:
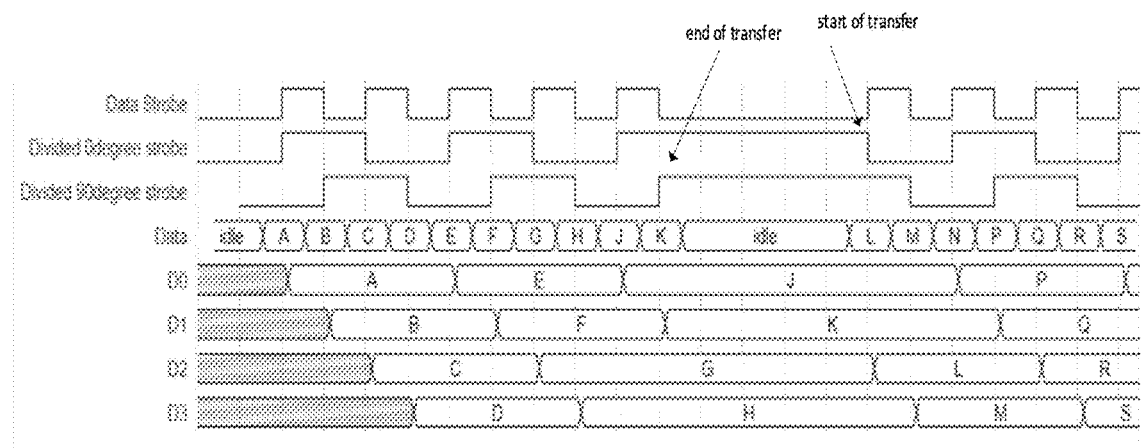
FIG. 4 is a waveform illustrating the end of a set of data transfer happens on flip-flop D1 in accordance with an embodiment of the present invention.
Figure 10:
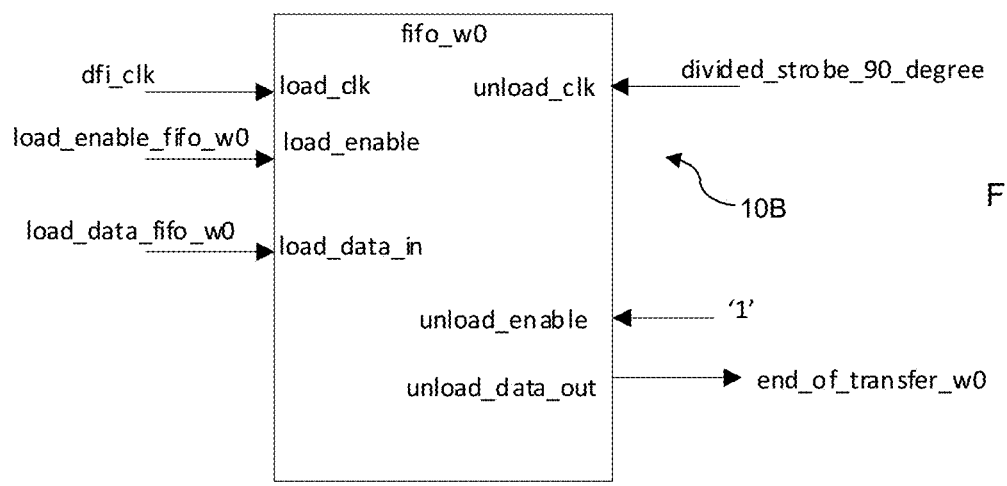
FIG. 10 illustrates a second first-in-first-out buffer in accordance with an embodiment of the present invention.
Figure 11:
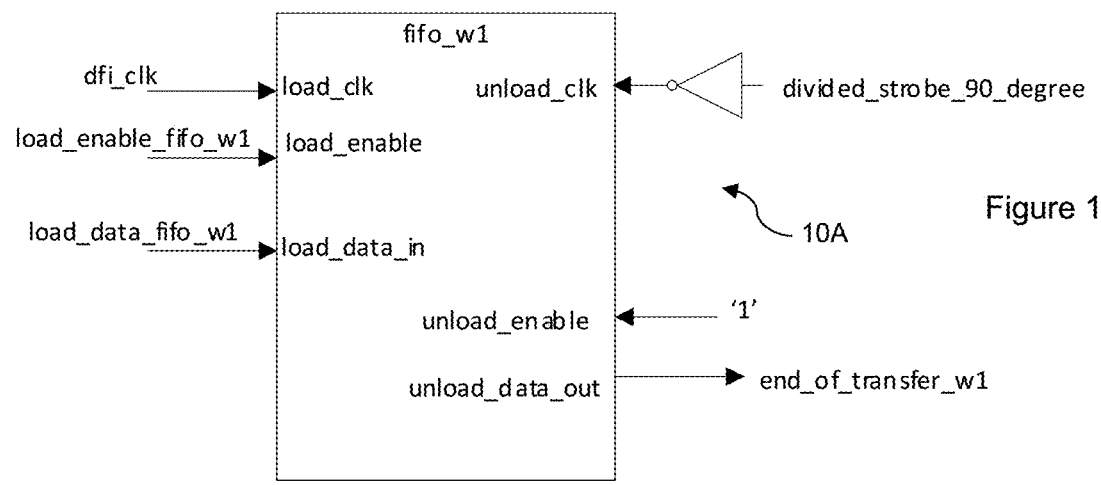
FIG. 11 illustrates a first first-in-first-out buffer in accordance with an embodiment of the present invention.

FIG. 3 is a waveform illustrating the end of a set of data transfer happens on flip-flop D3 in accordance with an embodiment of the present invention. FIG. 4 is a waveform illustrating the end of a set of data transfer happens on flip-flop D1 in accordance with an embodiment of the present invention. It is possible for the end of a set of data transfer to happen on flip-flop D1 if the number of data strobe is odd, and for the end of a set of data transfer to happen on flip-flop D2 if the number of data strobe is even. In order to detect the end of a set of data transfer happens on which flip-flop, two first-in-first-out (FIFO) buffers (10A and 10B) can be prepared. Referring to FIGS. 10 and 11, the first FIFO buffer (10A) named fifo_w1 is to detect the end of a set data transfer happened on flip-flop D3 while the second FIFO buffer (10B) named fifo_w0 is to detect the end of a set of data transfer happened on flip-flop D1. Both FIFO buffers (10A and 10B) have N-number of entries where N is implemented as a power of 2. For example, the FIFO buffers (10A and 10B) can have 4 entries, 8 entries or 16 entries. Each entry of the FIFO buffers (10A and 10B) has two bits.

Figure 5:
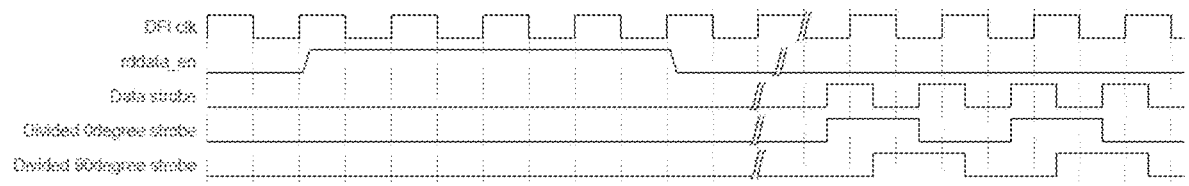
FIG. 5 is a waveform illustrating an example where a read data enable signal is asserted by a memory controller to a DDR4/5 physical interface for 4 cycles.
Figure 6:
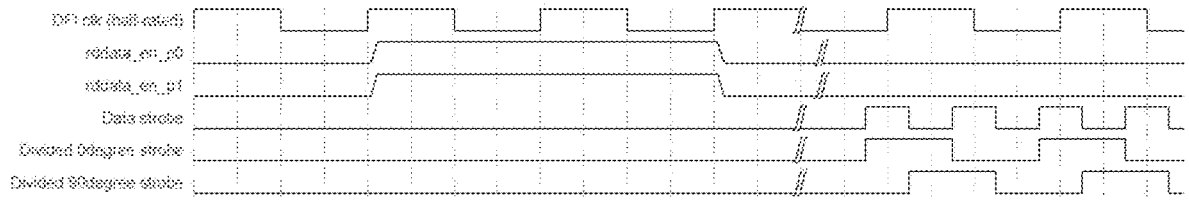
FIG. 6 is a waveform of FIG. 5 where DFI clock is half rated.

In accordance with an embodiment of the present invention, a DDR4/5 physical interface is connected to a memory controller via a DDR PHY interface protocol (DFI protocol). The memory controller asserts a read data enable (rddata_en) signal to the DDR4/5 physical interface to indicate that it wants to receive data from a memory device. The number of cycles of rddata_en signal that is asserted determines the number of cycles of data strobe will be toggled. FIG. 5 is a waveform illustrating an example where rddata_en is asserted by the memory controller to the DDR4/5 physical interface for 4 cycles and hence the data strobe sent from the memory device has 4 pulses. The number of data strobes in this embodiment is four which is an even number. The number of data strobes is possible to be odd number when there is CRC data or preamble/postamble. FIG. 6 is a waveform of FIG. 5 where the DFI clock is half rated and hence rddata_en is represented by rddata_en_p0 and rddata_en_p1. In the following embodiments, it is assumed that the DFI clock is half of the frequency of the DRAM device clock. In other embodiments, it is possible that the DFI clock is of the same frequency as the DRAM device clock or the DFI clock is a quarter of the frequency of the DRAM device clock.

Figure 7:
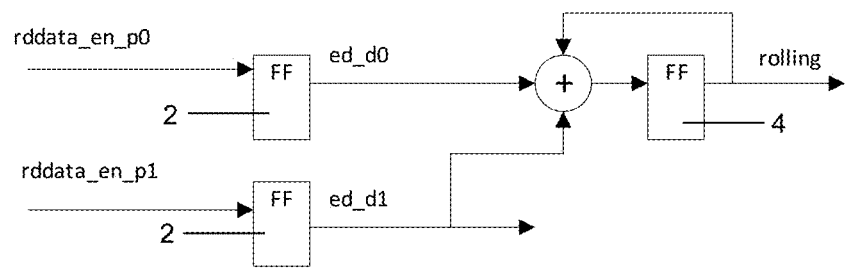
FIG. 7 shows a logic between two end-of-transfer detection flip-flops and a flag flip-flop in accordance with an embodiment of the present invention.

In accordance with an embodiment of the present invention, two end-of-transfer detection flip-flops (2), named e_d0 and e_d1, are prepared to sample the 2-bit rddata_en signal, rddata_en_p0 and rddata_en_p1, from the DFI interface. A flag flip-flop (4) named rolling which acts as a 1-bit flag is also prepared. FIG. 7 shows the logic between the two end-of-transfer detection flip-flops (2) and the flag flip-flop (4). On every cycle, the value of next rolling is equal to the value of current rolling plus the values of e_d0 and e_d1.

Figure 8:
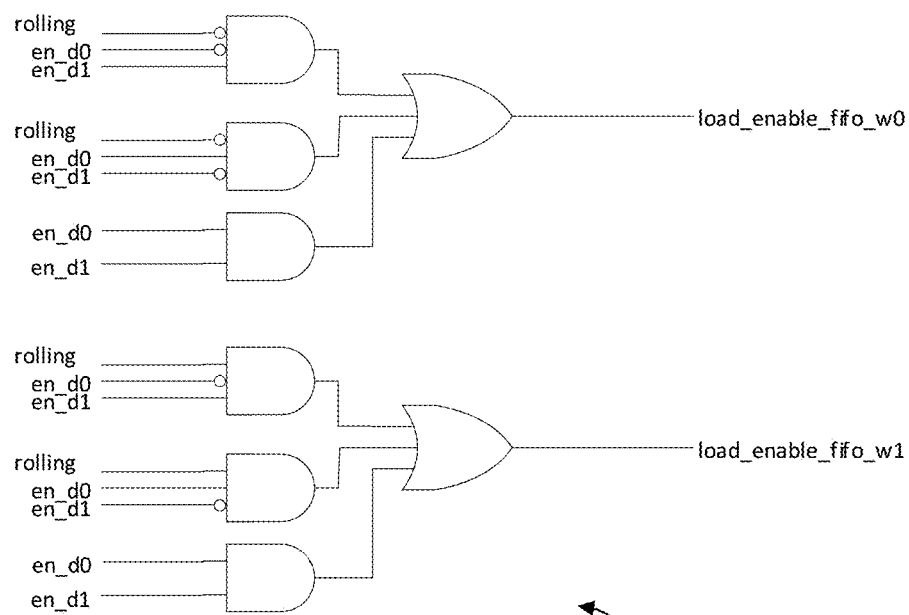
FIG. 8 shows a first logic circuit in accordance with an embodiment of the present invention.
Figure 9:
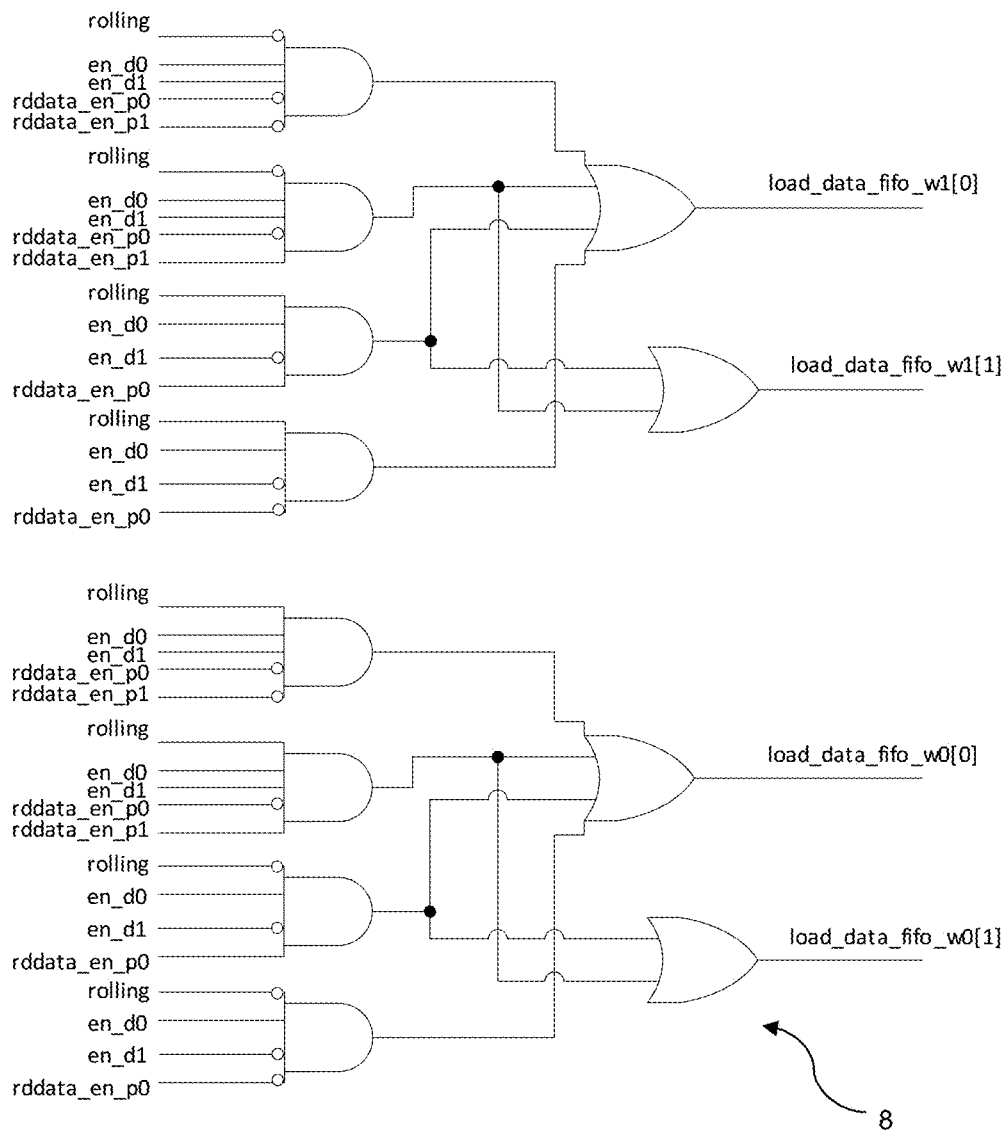
FIG. 9 shows a second logic circuit in accordance with an embodiment of the present invention.

In accordance with an embodiment of the present invention, a first logic circuit (6) is prepared to generate a load enable signal in response to the end-of-transfer detection flip-flops (2) and the flag flip-flop (4) as shown in FIG. 8. The first logic circuit (6) comprises a plurality of bitwise AND operators and a plurality of bitwise OR operators. A second logic circuit (8) is also prepared to generate a load data in response to the end-of-transfer detection flip-flops (2), the flag flip-flop (4) and the read data enable signal as shown in FIG. 9. The second logic circuit (8) comprises a plurality of bitwise AND operators and a plurality of bitwise OR operators as well. The operation of the first logic circuit (6) and the second logic circuit (8) is explained in the following section.

Next value of "rolling"=current value of "rolling"+value of e_d0+value of e_d1. The value of "rolling" is initialized to be 0 at the first cycle.

On every cycle, if "rolling"==0, several situations may happen as follows.

If (e_d0==1) and (e_d1==0), or if (e_d0==0) and (e_d1==1), the load enable signal for fifo_w0 is asserted.

If (e_d0==1) and (e_d1==1), the load enable signal is asserted for fifo_w0 and fifo_w1.

If (e_d0==1) and (ed_1==0) and (rddata_en_p0==0), the load data of 2'b01 is loaded into fifo_w0.

If (e_d0==1) and (ed_1==0) and (rddata_en_p0==1), the load data of 2'b11 is loaded into fifo_w0.

If (e_d0==1) and (ed_1==1) and (rddata_en_p0==0) and (rddata_en_p1==0), the load data of 2'b01 is loaded into fifo_w1.

If (e_d0==1) and (ed_1==1) and (rddata_en_p0==0) and (rddata_en_p1==1), the load data of 2'b11 is loaded into fifo_w1.

On other cases, the load data of 2'b00 is loaded into both FIFO buffers (10A and 10B), fifo_w0 and fifo_w1.

On every cycle, if "rolling"==1, several situations may happen as follows.

If (e_d0==1) and (e_d1==0), or if (e_d0==0) and (e_d1==1), the load enable signal for fifo_w1 is asserted.

If (e_d0==1) and (e_d1==1), the load enable signal is asserted for fifo_w0 and fifo_w1.

If (e_d0==1) and (ed_1==0) and (rddata_en_p0==0), the load data of 2'b01 is loaded into fifo_w1.

If (e_d0==1) and (ed_1==0) and (rddata_en_p0==1), the load data of 2'b11 is loaded into fifo_w1.

If (e_d0==1) and (ed_1==1) and (rddata_en_p0==0) and (rddata_en_p1==0), the load data of 2'b01 is loaded into fifo_w0.

If (e_d0==1) and (ed_1==1) and (rddata_en_p0==0) and (rddata_en_p1==1), the load data of 2'b11 is loaded into fifo_w0.

On other cases, the load data of 2'b00 is loaded into both FIFO buffers (10A and 10B), fifo_w0 and fifo_w1.

In accordance with an embodiment of the present invention, the FIFO buffers (10A and 10B) indicate where the end of a set of data transfer happens. For example, if fifo_w0 is loaded with the load data of 2'b01 or 2'b11, the end of a set of data transfer happens on flip-flop D1 since the second FIFO buffer (10B) named fifo_w0 is to detect the end of a set data transfer happened on flip-flop D1. If fifo_w1 is loaded with the load data of 2'b01 or 2'b11, the end of a set of data transfer happens on flip-flop D3 since the first FIFO buffer (10A) named fifo_w1 is to detect the end of a set data transfer happened on flip-flop D3.

Figure 12:
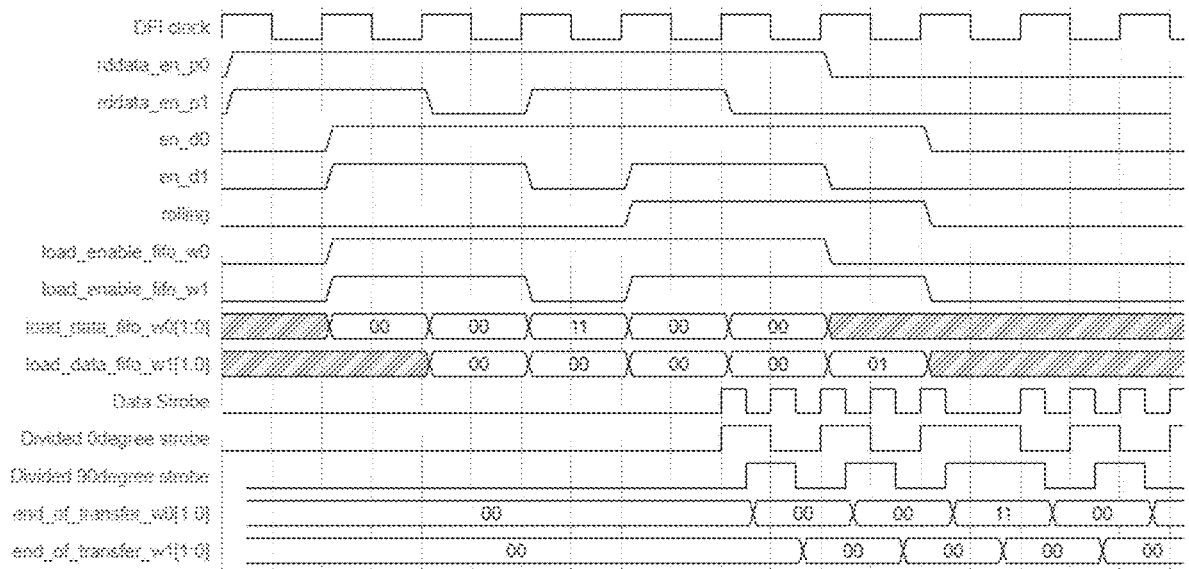
FIG. 12 is a waveform showing an example where there is end_of_transfer_w0[1:0]==2'b11.
Figure 13:
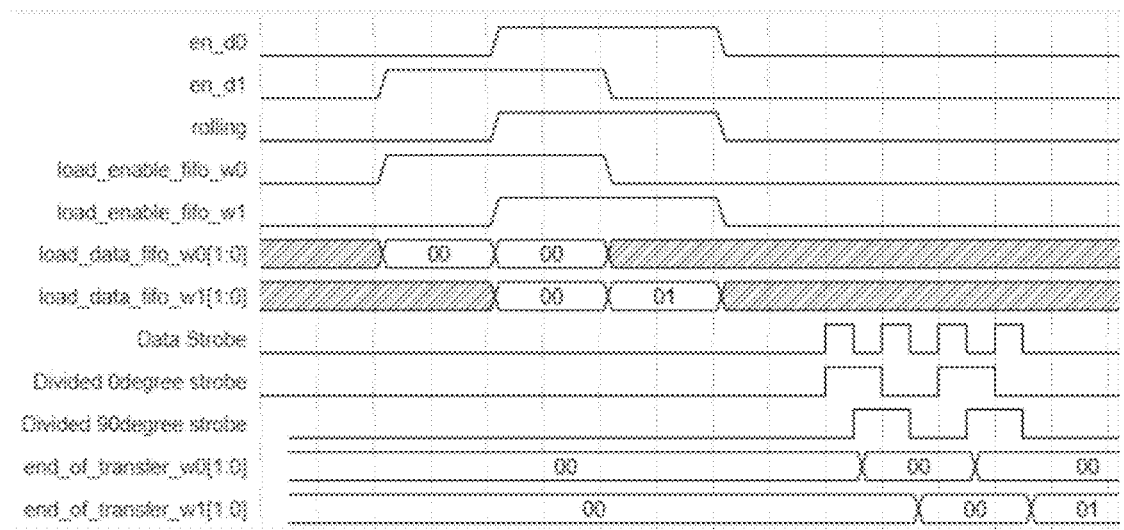
FIG. 13 is a waveform showing an example where there is end_of_transfer_w1[1:0]==2'b01.

In accordance with an embodiment of the present invention, the FIFO buffers (10A and 10B) unload the load data as an end-of-transfer indicator in line with data strobe. The clock used here is the uninverted divided 90-degree strobe for fifo_w0 and the inverted divided 90-degree strobe (equivalent to the divided 270-degree strobe) for fifo_w1. Referring to FIG. 12, the end-of-transfer indicator from fifo_w0 is unloaded in line with the rising edge of the divided 90-degree strobe. The unloaded data or the end-of-transfer indicator is called end_of_transfer_w0 and it is 2-bit wide. Referring to FIG. 13, the end-of-transfer indicator from fifo_w1 is unloaded in line with the falling edge of the divided 90-degree strobe. The unloaded data or the end-of-transfer indicator is called end_of_transfer_w1 and it is 2-bit wide.

In accordance with an embodiment of the present invention, the end-of-transfer indicator indicates idle time between the end of a set of data transfer and the start of a set of successive data transfer. The idle time comprises two unit intervals, four unit intervals or more, with every addition of two unit intervals. For example, if the value of end_of_transfer_w0[1] is 1, an idle of 2 UIs can be seen after flip-flop D1 captures the last valid data. If the value of end_of_transfer_w0[1] is 0, an idle of 4UIs or more can be seen after flip-flop D1 captures the last valid data. Similarly, if the value of end_of_transfer_w1[1] is 1, an idle of 2 UIs can be seen after flip-flop D3 captures the last valid data. If the value of end_of_transfer_w1[1] is 0, an idle of 4UIs or more can be seen after flip-flop D3 captures the last valid data. FIG. 12 is an example where end_of_transfer_w0[1:0]==2b'11, therefore 2 UIs of idle time can be seen after the first set of data transfer. FIG. 13 is an example where end_of_transfer_w1[1:0]==2b'01, therefore 4UIs or more of idle time can be seen after the first set of data transfer.

Figure 14:
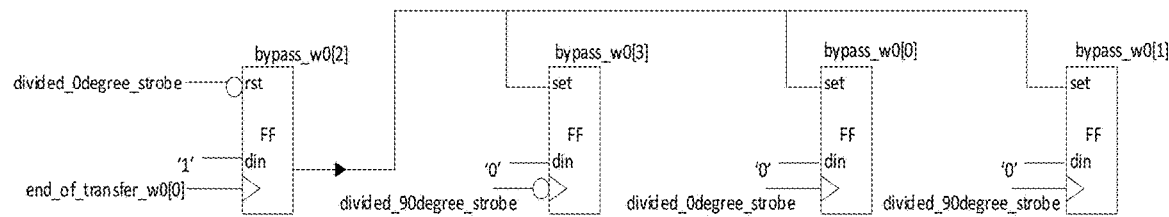
FIG. 14 illustrates a bypass flip-flop circuit for a second FIFO buffer in accordance with an embodiment of the present invention.

FIG. 14 illustrates a bypass flip-flop circuit for the second FIFO buffer (10B), fifo_w0. The bypass flip-flop circuit comprises four bypass flip-flops, namely bypass_w0[2], bypass_w0[3], bypass_w0[0] and bypass_w0[1]. The end-of-transfer indicator, end_of_transfer_w0[0], can be used to trigger the logic of the four bypass flip-flops, bypass_w0[3:0]. For example, bypass_w0[2] is clocked by end_of_transfer_w0[0] and its value is set to 1. It is then reset to 0 on the next falling edge of divided 0-degree strobe (or its equivalent divided 180-degree strobe). Further, bypass_w0[3], bypass_w0[0] and bypass_w0[1] are set to 1 on the rising edge of bypass_w0[2]. Bypass_w0[3] is then reset to 0 on the next falling edge of divided 90-degree strobe (or its equivalent divided 270-degree strobe). Bypass_w0[0] is then reset to 0 on the next rising edge of divided 0-degree strobe, and bypass_w0[1] is then reset to 0 on the falling edge of divided strobe 90-degree strobe.

Figure 15:
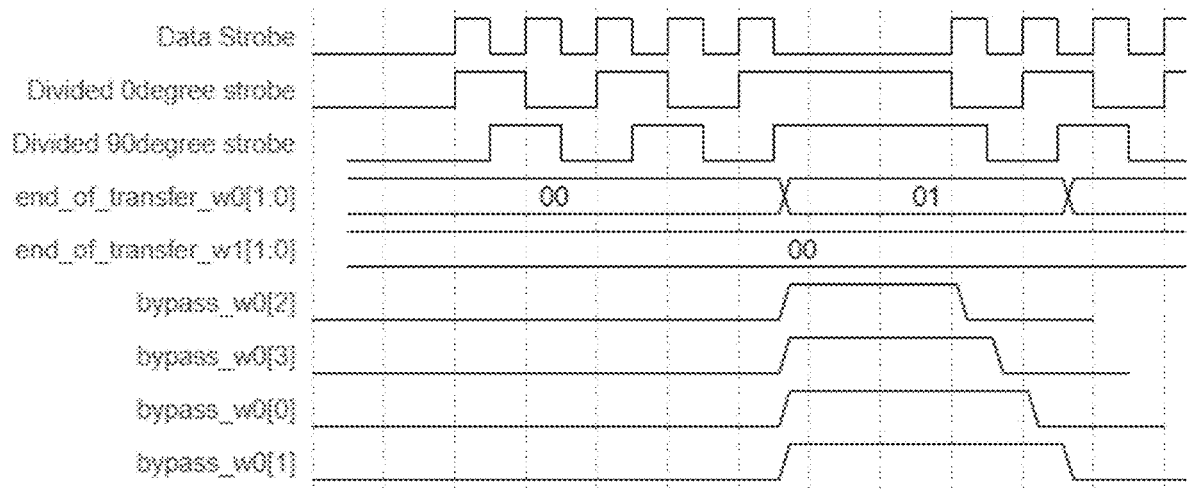
FIG. 15 illustrates a waveform of a bypass flip-flop circuit for a second FIFO buffer in accordance with an embodiment of the present invention.

FIG. 15 illustrates a waveform of bypass_w0[3:0] in accordance with an embodiment of the present invention. They are asynchronously set when end_of_transfer_w0[0] is asserted. They are then reset to 0 in a fashion as discussed in the previous paragraph.

Figure 16:
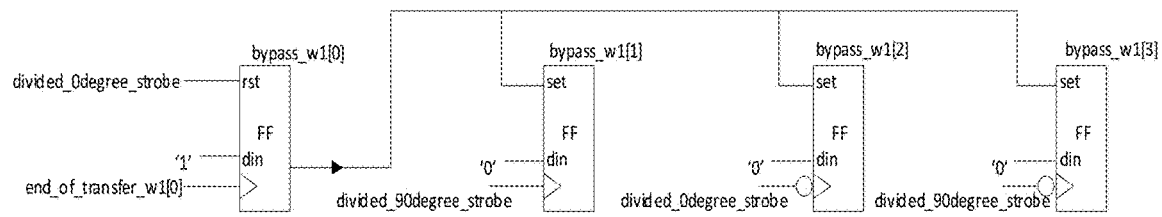
FIG. 16 illustrates a bypass flip-flop circuit for a first FIFO buffer in accordance with an embodiment of the present invention.

FIG. 16 illustrates a bypass flip-flop circuit for the first FIFO buffer (10A), fifo_w1. The bypass flip-flop circuit comprises four bypass flip-flops, namely bypass_w1[2], bypass_w1[3], bypass_w1[0] and bypass_w1[1]. End_of_transfer_w1[0] can be used to trigger the logic of the four bypass flip-flops, bypass_w1[3:0]. For example, bypass_w1[0] is clocked by end_of_transfer_w1[0] and its value is set to 1. It is then reset to 0 on the next rising edge of divided_0-degree strobe. Further, bypass_w1[1], bypass_w1[2] and bypass_w1[3] are set to 1 on the rising edge of bypass_w1[0]. Bypass_w1[1] is then reset to 0 on the next rising edge of divided 90-degree strobe. Bypass_w0[2] is then reset to 0 on the next falling edge of divided 0-degree strobe (or its equivalent rising edge of divided 180-degree strobe), and bypass_w0[3] is then reset to 0 on the falling edge of divided 90-degree strobe (or its equivalent rising edge of divided 270-degree strobe).

Figure 17:
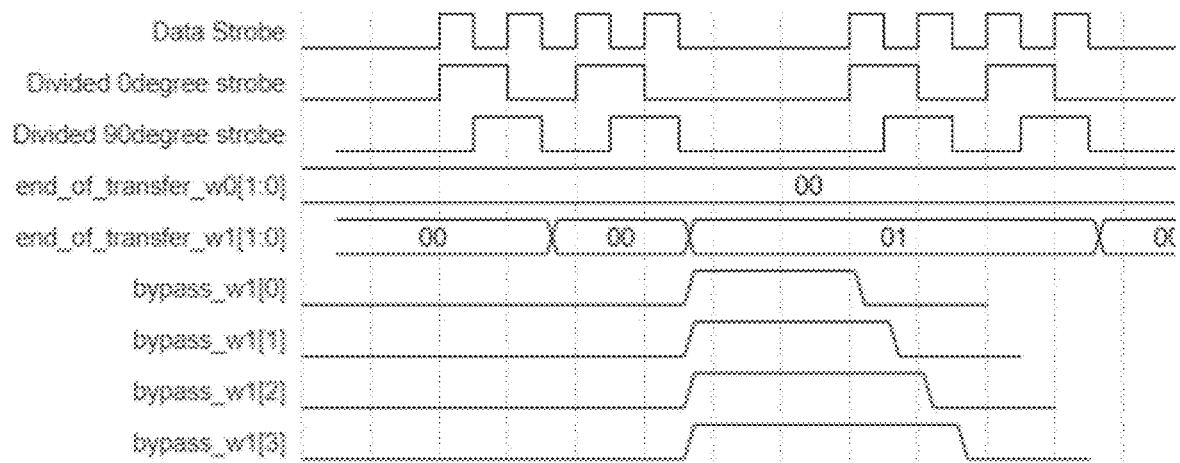
FIG. 17 illustrates a waveform of a bypass flip-flop circuit for a first FIFO buffer in accordance with an embodiment of the present invention.

FIG. 17 illustrates a waveform of bypass_w1[3:0]. They are asynchronously set when end_of_transfer_w1[0] is asserted. They are then reset to 0 in a fashion as discussed in the previous paragraph.

Figure 18:
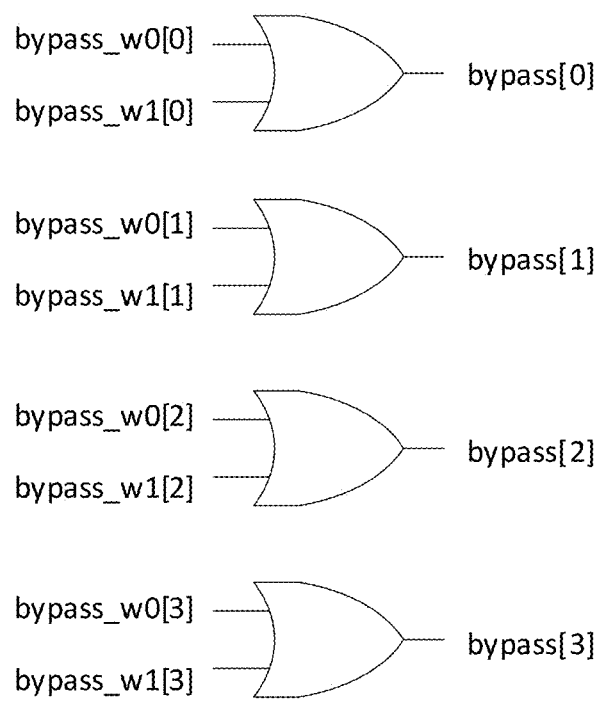
FIG. 18 illustrates a plurality of bitwise OR operators taken to generate bypass signals in accordance with an embodiment of the present invention.

In accordance with an embodiment of the present invention, bypass_w0[3:0] and bypass_w1[3:0] can be combined by bitwise OR operators as shown in FIG. 18 so as to generate a new set of bypass signals, bypass[3:0].

Figure 19:
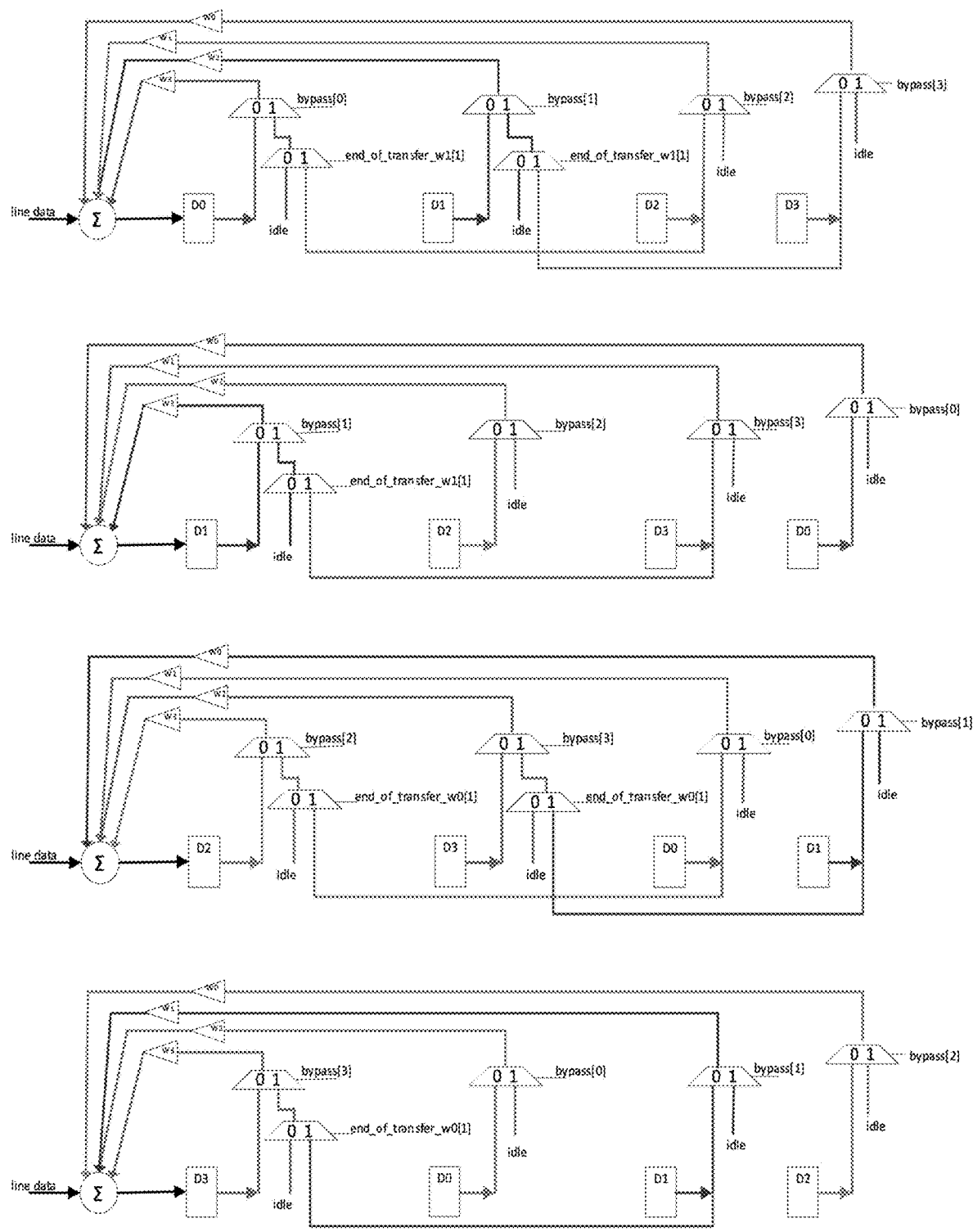
FIG. 19 illustrates a decision feedback equalizer in accordance with an embodiment of the present invention.

FIG. 19 illustrates a decision feedback equalizer in accordance with an embodiment of the present invention. The decision feedback equalizer comprises a plurality of multiplexers. Each multiplexer can select the appropriate idle data or flip-flop data as the output data to be multiplied with each coefficient based on the input of bypass[3:0], end_of_transfer_w0[1] and end_of_transfer_w1[1]. The operation of the multiplexers is described by the following logic.

For flip-flop D0:

a. If both bypass[0] and end_of_transfer_w1[1] are asserted, flip-flop D2 data is selected. If only bypass[0] is asserted, idle data is selected. Else, the previous data of flip-flop D0 is selected. The result of the selection is multiplied with coefficient W3.

b. If both bypass[1] and end of transfer_w1[1] are asserted, flip-flop D3 data is selected. If only bypass[1] is asserted, idle data is selected. Else, flip-flop D1 data is selected. The result of the selection is multiplied with coefficient W2.

c. The flip-flop D2 data is selected if bypass[2] is not asserted, or idle data is selected if bypass[2] is asserted, to multiply with coefficient W1.

d. The flip-flop D3 data is selected if bypass[3] is not asserted, or idle data is selected if bypass[3] is asserted, to multiply with coefficient W0.

For flip-flop D1:

a. If both bypass[1] and end of transfer_w1[1] are asserted, flip-flop D3 data is selected. If only bypass[1] is asserted, idle data is selected. Else, flip-flop D1 data is selected. The result of the selection is multiplied with coefficient W3.

b. The flip-flop D2 data is selected if bypass[2] is not asserted, or idle data is selected if bypass[2] is asserted, to multiply with coefficient W2.

c. The flip-flop D3 data is selected if bypass[3] is not asserted, or idle data is selected if bypass[3] is asserted, to multiply with coefficient W1.

d. The flip-flop D3 data is selected if bypass[0] is not asserted, or idle data is selected if bypass[0] is asserted, to multiply with coefficient W0.

For flip-flop D2:

a. If both bypass[2] and end_of_transfer_w0[1] are asserted, flip-flop D0 data is selected. If only bypass[2] is asserted, idle data is selected. Else, the previous data of flip-flop D2 is selected. The result of the selection is multiplied with coefficient W3.

b. If both bypass[3] and end of transfer_w0[1] are asserted, flip-flop D1 data is selected. If only bypass[3] is asserted, idle data is selected. Else, flip-flop D3 data is selected. The result of the selection is multiplied with coefficient W2.

c. The flip-flop D0 data is selected if bypass[0] is not asserted, or idle data is selected if bypass[0] is asserted, to multiply with coefficient W1.

d. The flip-flop D1 data is selected if bypass[1] is not asserted, or idle data is selected if bypass[1] is asserted, to multiply with coefficient W0.

For flip-flop D3:

a. If both bypass[3] and end of transfer_w0[1] are asserted, flip-flop D1 data is selected. If only bypass[1] is asserted, idle data is selected. Else, flip-flop D3 data is selected. The result of the selection is multiplied with coefficient W3.

b. The flip-flop D0 data is selected if bypass[0] is not asserted, or idle data is selected if bypass[0] is asserted, to multiply with coefficient W2.

c. The flip-flop D1 data is selected if bypass[1] is not asserted, or idle data is selected if bypass[3] is asserted, to multiply with coefficient W1.

d. The flip-flop D2 data is selected if bypass[2] is not asserted, or idle data is selected if bypass[0] is asserted, to multiply with coefficient W0.

The present invention also relates to a method for handling non-continuous data transfer for a decision feedback equalizer in a memory subsystem. The method is characterized by the steps of sampling a read data enable signal by a plurality of end-of-transfer detection flip-flops (2); generating a load enable signal in response to the end-of-transfer detection flip-flops (2) and a flag flip-flop (4) by a first logic circuit (6); generating a load data in response to the end-of-transfer detection flip-flops (2), the flag flip-flop (4) and the read data enable signal by a second logic circuit (8); receiving the load enable signal and the load data, and unloading the load data as an end-of-transfer indicator in line with data strobe by a plurality of first-in-first-out buffers (10A and 10B); and generating a bypass signal in response to the end-of-transfer indicator by a plurality of bypass flip-flops. Further, the bypass signal and the end-of-transfer indicator determine an idle data or a flip-flop data as an output data. Further, the output data is multiplied with a coefficient in the decision feedback equalizer.

Hereinafter, examples of the present invention will be provided for more detailed explanation. The advantages of the present invention may be more readily understood and put into practical effect from these examples. However, it is to be understood that the following examples are not intended to limit the scope of the present invention in any ways.

EXAMPLES

Figure 20:
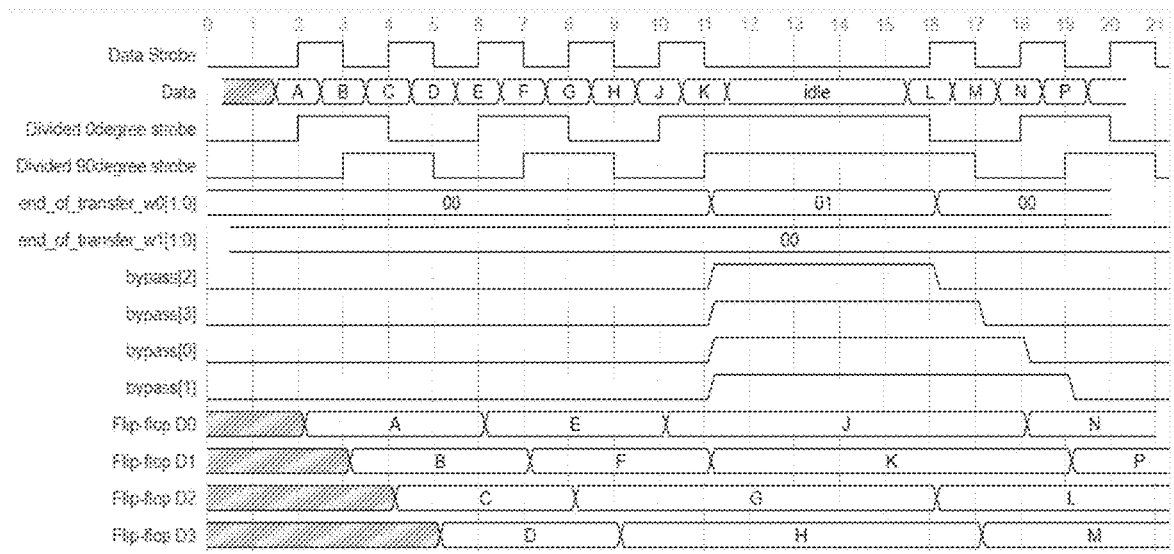
FIG. 20 is a waveform illustrating an example where four UIs of idle data are present between two sets of data transfers.

In the first example, there are 4UIs of idle between two sets of transfers. The end of the first data transfer happens on D1 flip-flop. Therefore, end_of_transfer_w0[1:0] is 2'b01. Idle data value is assumed to be 1. Referring to FIG. 20, the operation of the first example is described hereinafter.

a) At time 11, there is the last data chunk at UI 'K' of the first data transfer and it is sampled into flip-flop D1 at the rising edge of divided 90 degree strobe.

b) At time 11, end_of_transfer_w0[0] is asserted as well, causing bypass_w0[3:0] to be asserted.

c) From time 12 to 15, there are 4 UIs of idle data.

d) At time 16, the falling edge of divided 0-degree strobe samples the next valid data 'L' into flip-flop D2. The decision feedback equalizer for flip-flop D2 evaluates the logic as discussed earlier, where:

i. Only bypass[2] is asserted (end_of_transfer_w0[1] is not asserted), then idle data is selected to multiply with coefficient W3.

ii. Only bypass[3] is asserted (end_of_transfer_w0[1] is not asserted), then idle data is selected to multiply with coefficient W2.

iii. Idle data is selected to multiply with coefficient W1 because bypass[0] is asserted.

iv. Idle data is selected to multiply with coefficient W0 because bypass[1] is asserted.

e) At time 17, bypass[2] is deasserted. The falling edge of divided 90-degree strobe samples valid data 'M' into flip-flop D3. The decision feedback equalizer for flip-flop D3 evaluates the logic as discussed earlier, where:

i. Only bypass[3] is asserted (end_of_transfer_w0[1] is not asserted), then idle data is selected to multiply with coefficient W3.

ii. Idle data is selected to multiply with coefficient W2 because bypass[1] is asserted.

iii. Idle data is selected to multiply with coefficient W1 because bypass[1] is asserted.

iv. Bypass[2] is not asserted, so flip-flop D2 data is selected to multiply with coefficient W0.

f) At time 18, bypass[3] is deasserted. The rising edge of divided 0-degree strobe samples valid data 'N' at flip-flop D0. The decision feedback equalizer for flip-flop D0 evaluates the logic as discussed earlier, where:

i. Bypass[0] is still asserted, so idle data is selected to multiply with coefficient W3.

ii. Bypass[1] is still asserted, so idle data is selected to multiply with coefficient W2.

iii. Flip-flop D2 data is selected to multiply with coefficient W1 because bypass[2] is no longer asserted.

iv. Flip-flop D3 data is selected to multiply with coefficient W0 because bypass[3] is no longer asserted.

g) At time 19, bypass[0] is deasserted. The rising edge of divided 90-degree strobe samples valid data 'P' into flip-flop D1. The decision feedback equalizer for flip-flop D1 evaluates the logic as described earlier, where:

i. Bypass[1] is still asserted, so idle data is selected to multiply with coefficient W3.

ii. Flip-flop D2 data is selected to multiply with coefficient W2 because bypass[2] is no longer asserted.

iii. Flip-flop D3 data is selected to multiply with coefficient W1 because bypass[3] is no longer asserted.

iv. Flip-flop D0 data is selected to multiply with coefficient W0 because bypass[0] is no longer asserted.

Figure 21:
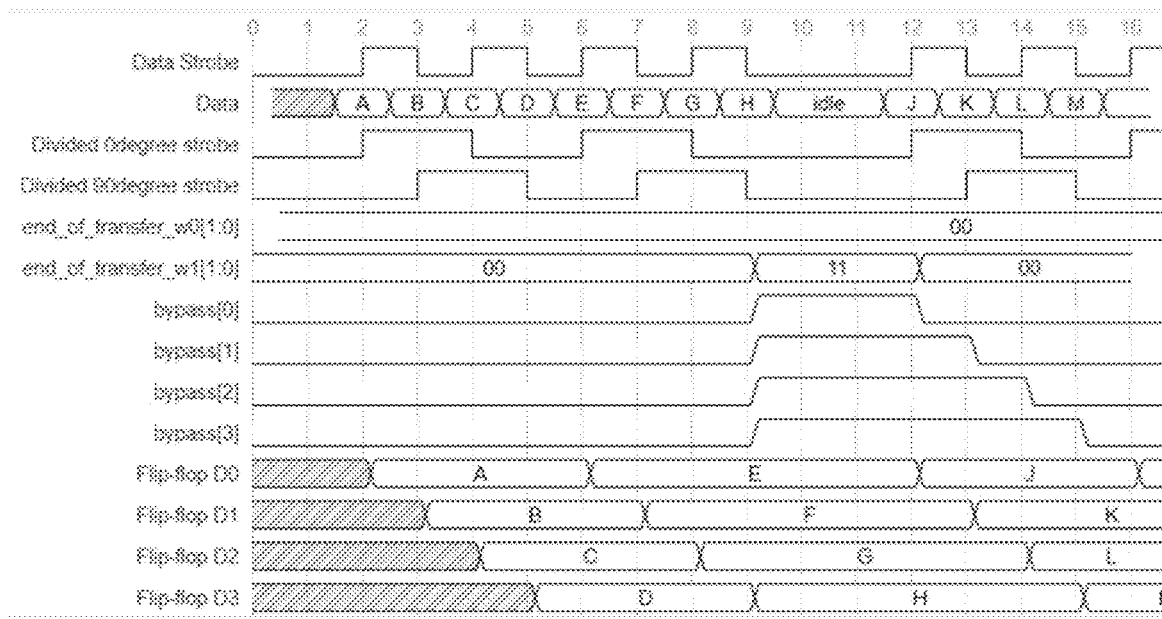
FIG. 21 is a waveform illustrating an example where two UIs of idle data are present between two sets of data transfers.

In the second example, there are 2UIs of idle between two sets of transfers. The end of the first data transfer happens on D3 flip-flop. Therefore, end_of_transfer_w1[1:0] is 2'b11. Idle data value is assumed to be 1. Referring to FIG. 21, the operation of the first example is described hereinafter.

a) At time 9, this is the last data chunk 'H' and it is sampled into flip-flop D3 at the falling edge of divided 90-degree strobe.

b) From time 10 to 11, there are 2 UIs of idle.

c) At time 12, the rising edge of divided 0-degree strobe samples the next valid data 'J' at flip-flop D0. The decision feedback equalizer for flip-flop D0 evaluates the logic as described earlier, where:

i. bypass[0] and end_of_transfer_w1[1] are both asserted, then flip-flop D2 data is selected to multiply with coefficient W3.

ii. bypass[1] and end_of_transfer_w1[1] are both asserted, then flip-flop D3 data is selected to multiply with coefficient W2.

iii. Idle data is selected to multiply with coefficient W1 because bypass[2] is asserted.

iv. Idle data is selected to multiply with coefficient W0 because bypass[3] is asserted.

d) At time 13, bypass[0] is deasserted, The rising edge of divided 90-degree strobe samples valid data at flip-flop D1. The decision feedback equalizer for flip-flop D1 evaluates the logic as described earlier, where:

i. bypass[1] and end_of_transfer_w1[1] are both asserted, then flip-flop D3 data is selected to multiply with coefficient W3.

ii. Idle data is selected to multiply with coefficient W2 because bypass[2] is asserted.

iii. Idle data is selected to multiply with coefficient W1 because bypass[3] is asserted.

iv. Bypass[0] is not asserted, so flip-flop D0 data is selected to multiply with coefficient W0.

e) At time 14, bypass[1] is deasserted. The falling edge of divided 0-degree strobe samples valid data at flip-flop D2. The decision feedback equalizer for flip-flop D2 evaluates the logic as described earlier, where:

i. Bypass[2] is still asserted, so idle data is selected to multiply with coefficient W3.

ii. Bypass[3] is still asserted, so idle data is selected to multiply with coefficient W2.

iii. Flip-flop D0 data is selected to multiply with coefficient W1 because bypass[0] is no longer asserted.

iv. Flip-flop D1 data is selected to multiply with coefficient W0 because bypass[1] is no longer asserted.

f) At time 15, bypass[2] is deasserted. The falling edge of divided 90-degree strobe samples valid data at flip-flop D3. The decision feedback equalizer for flip-flop D3 evaluates the logic as described earlier, where:

i. Bypass[3] is still asserted, so idle data is selected to multiply with coefficient W3.

ii. Flip-flop D0 data is selected to multiply with coefficient W2 because bypass[0] is no longer asserted.

iii. Flip-flop D1 data is selected to multiply with coefficient W1 because bypass[1] is no longer asserted.

iv. Flip-flop D2 data is selected to multiply with coefficient W0 because bypass[2] is no longer asserted.

The above-mentioned apparatus overcomes the problems and shortcomings of the existing solutions. For example, the apparatus of the present invention utilizes the FIFO buffers (10A and 10B) to determine when a previous set of transfer ends and how many UIs of idle data are present before a subsequent set of transfer starts. Further, the apparatus of the present invention utilizes a bypass logic to stagger idle data bypass for the decision feedback equalizer so as to correctly handle non-continuous data stream.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An apparatus for handling non-continuous data transfer for a decision feedback equalizer in a memory subsystem, the apparatus comprising:
    a plurality of end-of-transfer detection flip-flops configured to sample a read data enable signal;
    a flag flip-flop;
    a first logic circuit configured to generate a load enable signal in response to the end-of-transfer detection flip-flops and the flag flip-flop;
    a second logic circuit configured to generate a load data in response to the end-of-transfer detection flip-flops, the flag flip-flop, and the read data enable signal;
    a plurality of first-in-first-out buffers configured to receive the load enable signal and the load data, and unload the load data as an end-of-transfer indicator in line with data strobe; and
    a plurality of bypass flip-flops configured to generate a bypass signal in response to the end-of-transfer indicator, wherein
    the bypass signal and the end-of-transfer indicator determine an idle data or a flip-flop data as an output data, and
    the output data is multiplied with a coefficient in the decision feedback equalizer.

2. The apparatus as claimed in claim 1, wherein the first logic circuit comprises a plurality of bitwise AND operators and a plurality of bitwise OR operators.

3. The apparatus as claimed in claim 1, wherein the second logic circuit comprises a plurality of bitwise AND operators and a plurality of bitwise OR operators.

4. The apparatus as claimed in claim 1, the apparatus further comprising a plurality of multiplexers configured to select the idle data or the flip-flop data based on the bypass signal and the end-of-transfer indicator.

5. The apparatus as claimed in claim 1, the apparatus further comprising a plurality of bitwise OR operators to generate the bypass signal.

6. A method for handling non-continuous data transfer for a decision feedback equalizer in a memory subsystem, the method comprising:
    sampling a read data enable signal by a plurality of end-of-transfer detection flip-flops;
    generating a load enable signal in response to the end-of-transfer detection flip-flops and a flag flip-flop by a first logic circuit;
    generating a load data in response to the end-of-transfer detection flip-flops, the flag flip-flop, and the read data enable signal by a second logic circuit;

receiving the load enable signal and the load data, and unloading the load data as an end-of-transfer indicator in line with data strobe by a plurality of first-in-first-out buffers; and generating a bypass signal in response to the end-of-transfer indicator by a plurality of bypass flip-flops, wherein the bypass signal and the end-of-transfer indicator determine an idle data or a flip-flop data as an output data, and the output data is multiplied with a coefficient in the decision feedback equalizer.

\* \* \* \* \*